(No Model.)
E. F. LANE.
TOY.
No. 396,094. Patented Jan. 15, 1889.
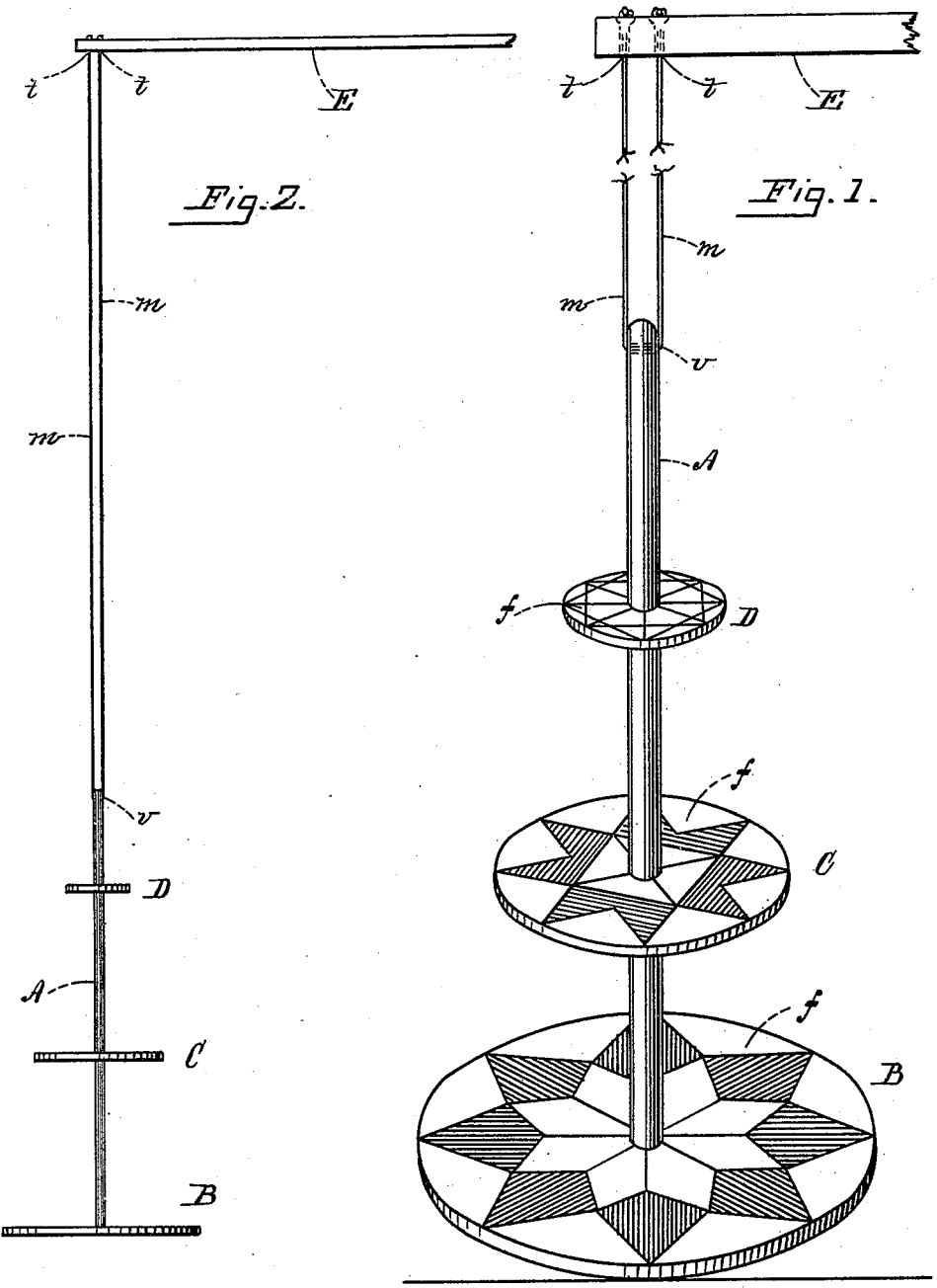

000
UNITED STATES PATENT OFFICE.

EBENEZER F. LANE, OF SWANZEY, NEW HAMPSHIRE.

TOY.

SPECIFICATION forming part of Letters Patent No. 396,094, dated January 15, 1889.

Application filed April 28, 1888. Serial No. 272,110. (No model.)

*To all whom it may concern:*

Be it known that I, EBENEZER F. LANE, of Swanzey, in the county of Cheshire, State of New Hampshire, have invented a certain new and useful Improvement in Toys, of which the following is a description sufficiently full, clear, and exact to enable any person skilled in the art or science to which said invention appertains to make and use the same, reference being had to the accompanying drawings, forming part of this specification, in which—

Figure 1 is an isometrical perspective view of my improved toy, and Fig. 2 a reduced side elevation.

Like letters and figures of reference indicate corresponding parts in the different figures of the drawings.

My invention relates to that class of toys which are designed to be trundled when in use in order to produce the best results or effects; and it consists in certain novel features, as hereinafter fully set forth and claimed, the object being to furnish a simple and durable article of this character which can be constructed at a comparatively low price.

The nature and operation of the improvement will be readily understood by all conversant with such matters from the following explanation.

In the drawings, A represents the body, and B C D the wheels or disks.

The body consists of a rod, preferably composed of wood, which may be of any suitable length and size to perform its functions properly.

The wheels are provided at their centers with holes, through which the body passes, and are firmly secured to said body at short distances from each other by any suitable and convenient means.

A stock or handle, E, is connected with the body A by a cord, $m$, which is passed through a hole at $v$ in the upper portion of said body, and has its ends secured in the end of the stock, as shown at $t\,t$.

The stock may be square, round, hexagonal, or of any other suitable form in cross-section, and is preferably about two and a half or three feet in length.

The wheels are painted in fanciful colors or inlaid with woods of different colors, to produce a kaleidoscopic effect as the wheels rotate.

Images or figures of any kind—such, for instance, as animals, birds, men, &c.—may be placed on or secured to the wheels, if desired, to increase or heighten the effect produced when the wheels are rotated.

In the use of my improvement the free end of the stock E is grasped in the hand and the wheels B C D placed on the ground, the wheel B being disposed farthest from the person holding the stock, after which the stock is swung rapidly in a horizontal plane, causing the wheels to rotate and the cords $m$ to be twisted together in a manner that will be readily understood by all conversant with such matters without a more explicit description. After the wheels have been rotated sufficiently to properly twist the cords the stock is lifted until the wheels are raised from the ground, whereupon the torsional action of the cords $m$ will cause them to rotate rapidly, producing a very beautiful and amusing effect. As the wheels are revolved by the torsional action of the cords after being raised from the ground, the cords will be untwisted; but the momentum imparted to the wheels will cause them to continue their revolutions after the cords are entirely untwisted, and thereby twist them together again, but in the opposite direction, thereby causing them to act to revolve the wheels in the opposite direction, and so on until the force stored up by the revolutions of the wheels on the ground is exhausted, after which the operation may be repeated with like results.

In swinging the body and wheels it will be obvious that the outer wheel will have to travel through a larger circle or an arc of a circle than the inner wheel, and hence the outer wheels, B C, are made proportionately larger than the inner wheel, D.

Any desired number of wheels may be employed, and they may be of any desired size or diameter if the proportions or sizes are properly maintained.

Having thus explained my invention, what I claim is—

1. In a toy of the character described, the body A, provided with a series of wheels of different sizes arranged in regular gradation, as B C D, the stock E, and the double cord $m$, combined and arranged to operate substantially as set forth.

2. In a toy of the character described, a body, as A, provided with a series of graded wheels secured thereon, as B C D, said wheels being ornamented or provided with figures, &c., to adapt them to produce kaleidoscopic effects when rotated, in combination with a stock, as E, and a double string, as $m$, connecting said body and stock, all being arranged to operate substantially as specified.

EBENEZER F. LANE.

Witnesses:
W. STARR KING,
CHARLES H. HUSEY.